US011960244B2

(12) United States Patent
Tschumi

(10) Patent No.: US 11,960,244 B2
(45) Date of Patent: Apr. 16, 2024

(54) DEVICE FOR LOCKING A TIMEPIECE MOVEMENT

(71) Applicant: The Swatch Group Research and Development Ltd, Marin (CH)

(72) Inventor: Philipp Tschumi, Niederwil (CH)

(73) Assignee: The Swatch Group Research and Development Ltd, Marin (CH)

( * ) Notice: Subject to any disclaimer, the term of this patent is extended or adjusted under 35 U.S.C. 154(b) by 232 days.

(21) Appl. No.: 17/467,503

(22) Filed: Sep. 7, 2021

(65) Prior Publication Data

US 2022/0121155 A1 Apr. 21, 2022

(30) Foreign Application Priority Data

Oct. 16, 2020 (EP) .................................... 20202347

(51) Int. Cl.
*G04B 37/05* (2006.01)
*G04B 37/06* (2006.01)

(52) U.S. Cl.
CPC ............ *G04B 37/05* (2013.01); *G04B 37/06* (2013.01)

(58) Field of Classification Search
CPC ...................................................... G04B 19/14
See application file for complete search history.

(56) References Cited

U.S. PATENT DOCUMENTS 3,668,865 A * 6/1972 Hirabayashi ........... G04B 19/14 968/157
4,970,708 A * 11/1990 Gagnebin .............. G04B 37/11 368/300
2009/0245032 A1 10/2009 Bonnet et al.
2012/0249797 A1* 10/2012 Haddick ................ G04G 21/04 701/491

FOREIGN PATENT DOCUMENTS

| | | | |
|---|---|---|---|
| CH | 534 674 | A4 | 11/1975 |
| EP | 0 600 389 | A1 | 6/1994 |
| EP | 1 906 268 | A1 | 4/2008 |
| JP | 49-16777 | Y | 4/1974 |
| JP | 52-10346 | A | 1/1977 |
| JP | 52-24563 | A | 2/1977 |
| JP | 2010-505091 | A | 2/2010 |

OTHER PUBLICATIONS

Translation of JPS5224563, Espacenet.*
European Search Report of European Application No. 20 20 2347 dated Mar. 18, 2021.

* cited by examiner

*Primary Examiner* — Renee S Luebke
*Assistant Examiner* — Matthew Hwang
(74) *Attorney, Agent, or Firm* — Sughrue Mion, PLLC

(57) ABSTRACT

A timepiece (100) including a case (10) including a middle (1), the top part whereof is closed by a bezel (2) and the bottom part whereof is closed by a back (3), a horological movement (4) mounted against the middle (1) by means of a casing ring (5), wherein the casing ring (5) comprises at least two clippable parts (50, 51) which hold the horological movement (4), the two parts being inseparable once mounted against the middle (1) when closing the case (10) of the timepiece (100).

5 Claims, 1 Drawing Sheet

DEVICE FOR LOCKING A TIMEPIECE MOVEMENT

CROSS REFERENCE TO RELATED APPLICATIONS

This application claims priority to European Patent Application No. 20202347.9, filed on Oct. 16, 2020, the entire contents of which are incorporated herein by reference.

FIELD OF THE INVENTION

The invention relates to a device for locking a timepiece movement and more specifically, to a device of this type for immobilising a quartz or self-winding mechanical movement.

BACKGROUND OF THE INVENTION

In order to fixedly mount a mechanical horological movement, screws and/or clamps are known to be used to immobilise said movement relative to the middle of the timepiece. This solution can be unsatisfactory if looking to reduce the overall dimensions or manufacture a timepiece at a reasonable cost.

SUMMARY OF THE INVENTION

The purpose of the present invention is to overcome all or part of the aforementioned drawbacks by proposing a timepiece including a locking device which has no screws and/or clamps and which allows the timepiece to be assembled in a simplified manner.

For this purpose, the invention relates to a timepiece including a case comprising a middle, the top part whereof is closed by a bezel and the bottom part whereof is closed by a back, a horological movement mounted against the middle by means of a casing ring, characterised in that the casing ring comprises at least two clippable parts which hold the horological movement, the two parts being inseparable once mounted against the middle when closing the case of the timepiece.

Advantageously according to the invention, the timepiece assembly includes a minimal number of parts and can thus be more easily adapted to manufacturing variations in the various components, while remaining high-tech, with, in particular, a chronograph, a date, a mechanical movement, a transparent back and a plastic middle.

According to other advantageous features of the invention:

- the two clippable parts are two semi-annular parts, the face whereof facing the movement including a groove which engages with a plate of said horological movement in order to guarantee the positioning and the holding thereof;
- said two parts respectively comprise at least one male element and one female element arranged such that they are clipped inside one another, said male part comprising a body and a head arranged so as to engage, by interlocking, with a recess in the female part;
- at least one of the parts comprises a positioning lug arranged so as to engage with a notch in the horological movement to guarantee the orientation of the movement relative to the encasing ring;
- said clippable parts comprise an upper portion, a middle portion and a lower portion, said upper portion receiving said groove;

- one of the clippable parts has a through-hole to allow for the passage of a winding stem;
- the horological movement is of the mechanical or quartz type.

BRIEF DESCRIPTION OF THE DRAWINGS

Other specific features and advantages will be clearly observed in the following description, which is given as a rough guide and in no way as a limited guide, with reference to the accompanying figures, wherein.

DETAILED DESCRIPTION OF THE PREFERRED EMBODIMENTS

Figure 1:
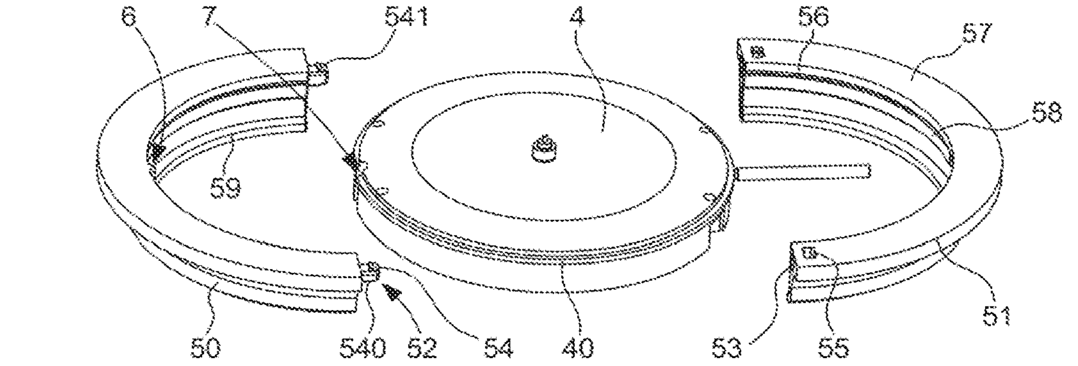
FIG. 1 is an exploded, perspective view of a locking device of the timepiece according to the invention.

FIG. 1 shows an exploded view of a timepiece 100 according to the invention. It mainly includes a case 10, a horological movement 4 and a casing ring 5. The case 10 includes a middle 1, the top part whereof is closed by a bezel 2 and the bottom part whereof is closed by a back 3, the middle 1 being intended to receive the horological movement 4 fitted with the casing ring 5.

Preferably, the middle 1, the bezel and the back are made of a metal or metal alloy, however any other type of material can be considered such as, for example, a plastic material, a ceramic or a composite material.

The horological movement 4 is preferably of the mechanical type, however use of a quartz movement is also possible and not problematic.

As seen in FIGS. 1, 2, 3 and 5, the movement 4 is mounted on the shoulder 28 of the middle 1 via the casing ring 5. The casing ring 5 is thus intended to adapt and hold the movement 4 against the inner wall of the middle 1. The casing ring 5 takes the form of a generally annular body whose outer wall comprises at least one shoulder 44.

Advantageously, the casing ring 5 comprises at least two parts 50, 51 which can be clipped together and which hold the horological movement 4. The two parts 50, 51 are inseparable once they are assembled and mounted against the middle 1 when the case 10 is closed.

Figure 2:
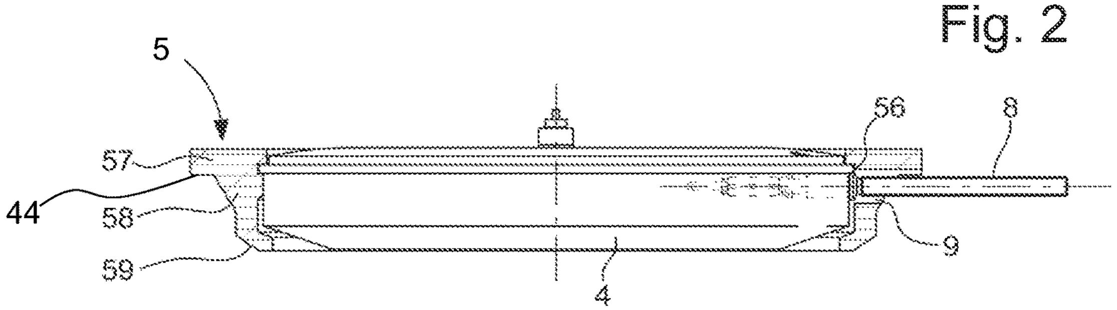
FIG. 2 is a sectional view of a locking device of the timepiece according to the invention.
Figure 3:
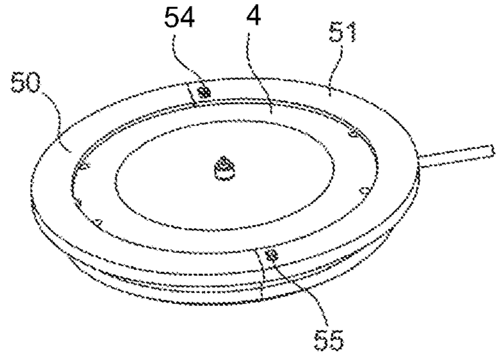
FIGS. 3 and 4 are perspective views from above and from below of a locking device of the timepiece according to the invention.
Figure 4:
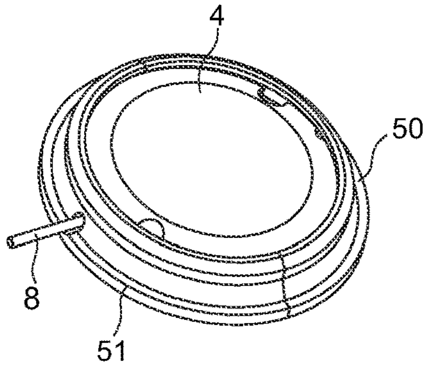
Figure 5:
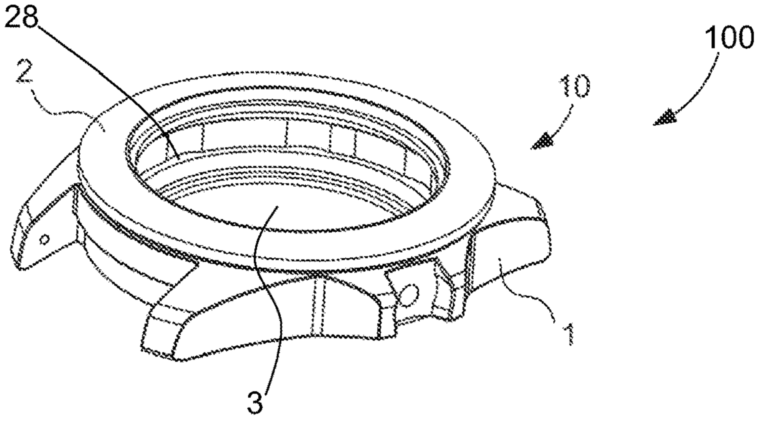
FIG. 5 is a perspective view of a timepiece fitted with a locking device.

As shown in FIGS. 1, 2 and 3, the two clippable parts 50, 51 take the form of two semi-annular parts, the face whereof facing the movement 4, or the inner face whereof, includes a groove 56 engaging with a plate 40 of the horological movement 4 in order to guarantee the positioning and the holding thereof when the two parts are clipped together. To assemble the casing ring 5, each part 50, 51 is placed on either side of the horological movement 4 such that the plate lies in the grooves 56.

Each of the two parts 50, 51 comprises at least one male element 54 and one female element arranged such that they are clipped inside one another, the male part comprising a body and a head arranged so as to engage, by interlocking, with a recess in the female part. As shown in the figures, each end of one of the parts 50 comprises a male element, and each end of the other part 51 comprises a female element. Each part 50, 51 can also be provided with one male and one female element, the position of the male and female elements being the reverse of one another.

As can be seen in the figures, the male element 54 has a body 540 having a rectangular cross-section and a head 541 that is trapezoidal in shape, the head being located in the continuation of the body. The female element comprises an orifice 53 disposed on the edge of the part 51, the orifice being complementary in shape to the head 541 of the male element such that the male element can be inserted into the orifice. The female element further comprises an opening 55 disposed on the top of the part 51 and opening out into the orifice 53, the opening 55 being arranged to engage with the head 541 of the male element 54 and thereby enable assembly via clipping.

The present invention describes a casing ring 5 comprising two parts 50, 51 that can be clipped together, however a person skilled in the art would have no difficulty in producing a three- or four-part encasing ring for example. The number of parts should ideally be kept to a minimum, this being two parts in the present case of the invention, so as to ensure good rigidity of the assembly and a better hold. More specifically, the two-part ring reduces the amount of play in the assembly and the number of parts that can break.

As shown in FIG. 1, each shoulder 44 is intended to come into contact with the shoulder 28 of the middle 1. This contact allows the height of the casing ring 5, and thus of the movement 4, to be adjusted relative to the middle 1. Moreover, the casing ring 5 is preferably notched in order to free space respectively around the mechanical controls 53, 55 of the chronograph and the hole 54 for controlling the hand-setting device and, where appropriate, the date device.

Advantageously, one of the parts 50 comprises a positioning lug 6 arranged to engage with a correspondingly shaped notch 7 made in the horological movement 4 to guarantee the orientation of the movement relative to the encasing ring, and implicitly relative to the middle of the watch case.

As shown, the clippable parts 50, 51 comprise an upper portion 57, a middle portion 58 and a lower portion 59. The upper portion 58 receives the groove 56 on the inner face and has an outer diameter that is greater than the diameter of the middle and lower portions so as to form a shoulder intended to be in contact with the middle. This contact allows the height of the casing ring 5, and thus of the movement 4, to be adjusted relative to the middle. Moreover, one of the clippable parts 50, 51 has, at the middle portion 58 thereof, a through-hole 9 to allow for the passage of a winding stem 8.

The lower portion 59 of the casing ring 5 includes an inner diameter that is slightly smaller than the inner diameter of the upper and middle portions so as to encase the horological movement 5 and limit the motion thereof in the event of impacts for example.

The description hereinbelow describes the assembly of the casing ring on a movement and the assembly of the whole inside a watch case.

In a first step, the movement 4 is prepared and the two parts 50, 51 are arranged on either side thereof so as to align the plate 40 with the groove 56, and align the positioning lug 6 with the notch 7 in the movement. Advantageously, the guidance of the parts 50, 51 is improved by the interaction of the positioning lug present on the casing ring 5.

In a second step 7, the parts 50 and 51 are pressed against the horological movement 5 such that the plate 40 rests inside the groove 56 and such that the male elements clip into the female elements. The operator knows that the assembly is complete when he/she hears the characteristic sound made by clippable assemblies, which in this case is reproduced by the passage of the head 540 into the opening 55.

Then, the assembly as a whole is placed inside the middle and the winding stem 8 is mounted on the movement 4 by successively passing through a hole in the middle, then through the passage 9 of the casing ring 5.

Finally, the crystal, the bezel and the back are mounted on the middle, thus completing the assembly of the timepiece.

It goes without saying that the present invention is not limited to the example shown but that various alternatives and modifications that may be apparent to a person skilled in the art can be made thereto while remaining within the scope of the claims.

The invention claimed is:

1. A timepiece including a case comprising a middle, a top part whereof is closed by a bezel and a bottom part whereof is closed by a back, a horological movement mounted against the middle by means of a casing ring, wherein the casing ring comprises at least two clippable parts which hold the horological movement, the two parts being inseparable once mounted against the middle when closing the case of the timepiece, wherein said two clippable parts respectively comprise at least one male part and one female part arranged such that they are clipped inside one another, said male part comprising a body and a head arranged so as to engage, by interlocking, with a recess in the female part, and the female part further comprises an opening disposed on the top of one of the clippable parts and opening out into the recess for receiving the head.

2. The timepiece according to claim 1, wherein the two clippable parts are two semi-annular parts, a face whereof facing the movement including a groove which engages with a plate of said horological movement in order to guarantee the positioning and the holding thereof.

3. The timepiece according to claim 2, wherein said clippable parts comprise an upper portion, a middle portion and a lower portion, said upper portion having said groove.

4. The timepiece according to claim 1, wherein at least one of the clippable parts comprises a positioning lug arranged so as to engage with a notch in the horological movement to guarantee the orientation of the movement relative to the casing ring.

5. The timepiece according to claim 1, wherein one of the clippable parts has a through-hole to allow for passage of a winding stem.

* * * * *